UNITED STATES PATENT OFFICE.

SPENCER B. NEWBERRY, OF BAYBRIDGE, OHIO.

BASIC FIRE-BRICK LINING.

No. 927,585.  Specification of Letters Patent.  Patented July 13, 1909.

Application filed March 28, 1908. Serial No. 423,908.

*To all whom it may concern:*

Be it known that I, SPENCER B. NEWBERRY, a citizen of the United States, and a resident of Baybridge, Ohio, have invented certain new and useful Improvements in Basic Fire-Brick Linings, of which the following is a specification.

My improvement relates to that class of linings usually employed for rotary cement kilns, limekilns and other kilns in which the charge is of such a basic character as to rapidly attack and destroy ordinary firebrick, and my invention consists of a lining in the form of molded blocks or slabs of the character hereinafter fully set forth.

Heretofore clinker brick have been produced by mixing Portland cement clinker and ground cement with water, and molding into the desired shape, but as heretofore made they have had the serious drawback that the entire mass of the bricks is not transformed by the action of the kiln, so that, although the face of the mass becomes hardened by the action of the heat, there is a zone of weakness back of this face which causes the face to scale off, destroying the efficiency of the lining; while, further, the mass of the material after long continued heating and cooling down, disintegrates, breaking up in the form of dust, and is therefore lost when the kiln is allowed to become cool. I have found that these defects may be overcome by subjecting the proper composition to such a heat and for such a length of time as to practically transform the entire mass, driving off all of the combined water of the cement throughout the mass and forming a dense, compact block of uniform character throughout, and that said block, when used for lining in a kiln, will perfectly resist the action of the lime of the charge and remain firm and durable through long periods of service, without scaling and without disintegrating on cooling.

In carrying my invention into practice I take cement clinker, formed by calcining Portland or natural cement raw material, and pulverize the same, reducing it to a coarse powder, preferably such as will pass through a one-tenth or a one-twentieth inch screen. In this pulverizing operation a portion of finer material or dust will be formed which will cause the mixture to set well when water is added. This pulverized clinker is then mixed with the proper amount of water to form a dough or body and is then tamped into molds of suitable size and shape. After setting or hardening for twenty-four hours or more the blocks are then thoroughly dried and subjected in a suitable kiln (preferably of the down-draft type, such as used in burning ordinary fire-brick) to a sintering heat; that is, a bright orange heat for from twelve to forty-eight hours, or longer if necessary, the heat being continued for such a length of time as to transform the entire mass. After being thus burned the bricks are cooled and are then ready to be used in lining cement furnaces, or limekilns or other furnaces, and to form a durable basic lining free from all tendency to flux or corrode under the action of the material being treated and which will not scale and will not disintegrate when the furnace is cooled. In laying up the lining I prefer to make use of a Portland cement mixture as a mortar, making the joint as close as possible.

While in many cases blocks of the proper character may be formed by thus burning the clinker brick alone, I have found that a great advantage may be secured by adding to the coarsely ground clinker a suitable proportion of lime, and especially of dolomitic or magnesium lime. Magnesian lime is preferable for the reason that a much larger quantity can be used than of pure lime, inasmuch as more than a certain percentage of pure lime results in a tendency to air-slack and disintegrate on storage, while magnesian lime has no such injurious effect, and at the same time acts similarly to lime in increasing the basic character of the resulting lining, and overcoming the tendency to fall to dust on cooling after long-continued heating. In thus making use of lime or magnesian lime in making clinker brick, I have found that good results ensue from the addition to the clinker brick mixture of from five to twenty per cent. of the lime or magnesian lime, the most advantageous quantity can be used depending on the composition of the clinker and of the lime employed, a clinker high in lime requiring a smaller addition than one containing a lower proportion of lime. The lime or magnesian lime added may be in the form of commercial slaked or hydrate lime, or of quick-lime slaked to a paste before mixing with the clinker. In the process of burning the blocks, the lime or magnesian lime is absorbed by and combines with the clinker, increasing the strength and density of the blocks and making the mass slightly more basic than the charge of the cement kiln, thus increasing its resistance to fluxing or fusing and overcoming its tendency to disintegrate on cooling after long-continued heating. The magnesia lime is equivalent to the lime in this respect, with the added advantage of permitting a larger proportion to be used, as any desired amount of magnesia may be added up to fifty or even one hundred per cent. of the cement clinker employed.

I claim as my invention:

1. A refractory brick consisting of granulated hydraulic cement clinker, molded and burned so as to be freed from water and of a uniform character throughout.

2. A basic brick consisting of granulated hydraulic cement clinker and an alkaline earth molded and burned so as to be freed from water and of a uniform character throughout.

3. A basic brick consisting of granulated hydraulic cement clinker and lime molded and burned so as to be freed from water and of a uniform character throughout.

4. A basic brick consisting of hydraulic cement clinker, lime and magnesia, molded and burned so as to be freed from water and of a uniform character throughout.

5. The method of manufacturing a refractory material which consists in granulating hydraulic cement clinker, mixing it with water into a paste, and burning the mixture until it is freed from water, sintered together, and is of a uniform character throughout.

6. The method of manufacturing a refractory material, which consists in granulating hydraulic cement clinker, mixing it with an alkaline earth and water into a paste, and burning the mixture until it is freed from water and of a uniform character throughout.

7. The method of manufacturing a refractory material, which consists in granulating hydraulic cement clinker, mixing it with lime and water into a paste, and burning the mixture until it is freed from water and of a uniform character throughout.

8. The method of manufacturing a refractory material, which consists in granulating hydraulic cement clinker, mixing it with lime, magnesia and water into a paste, and burning the mixture until it is freed from water and of a uniform character throughout.

9. The method of manufacturing a refractory brick, which consists in granulating hydraulic cement clinker, mixing it with water into a paste, molding it into a brick, drying it, and burning it until it is freed from water and is of a uniform character throughout.

10. The method of manufacturing a refractory brick, which consists in granulating hydraulic cement clinker, mixing it with an alkaline earth and water into a paste, molding it into a brick, drying it, and burning it until it is freed from water and is of a uniform character throughout.

In testimony whereof I affix my signature in presence of two witnesses.

SPENCER B. NEWBERRY.

Witnesses:
WILLIAM L. TROST,
BERT MARTIN.